March 4, 1952 J. G. WILSON Re. 23,468

REVERSIBLE HAMMER MILL WITH MATERIAL DEFLECTING FEED STRUCTURE

Original Filed Feb. 17, 1948 2 SHEETS—SHEET 1

INVENTOR.
J. Gilmore Wilson
BY
Frank A. Bower
ATTORNEY.

March 4, 1952 J. G. WILSON Re. 23,468

REVERSIBLE HAMMER MILL WITH MATERIAL DEFLECTING FEED STRUCTURE

Original Filed Feb. 17, 1948 2 SHEETS—SHEET 2

INVENTOR.

BY J. Gilmore Wilson

Frank A. Bower

ATTORNEY.

Reissued Mar. 4, 1952 Re. 23,468

UNITED STATES PATENT OFFICE 23,468

REVERSIBLE HAMMER MILL WITH MATERIAL DEFLECTING FEED STRUCTURE

John Gilmore Wilson, Malvern, Pa., assignor to Pennsylvania Crusher Company, Philadelphia, Pa., a corporation of New York Original No. 2,514,111, dated July 4, 1950, Serial No. 8,831, February 17, 1948. Application for reissue July 6, 1951, Serial No. 235,507

3 Claims. (Cl. 241—186)

Matter enclosed in heavy brackets [ ] appears in the original patent but forms no part of this reissue specification; matter printed in italics indicates the additions made by reissue.

This invention relates to reversible hammermills for instance as illustrated in the patent of W. A. Battey No. 2,149,571 issued March 7, 1939, and of Stanley D. Hartshorn No. 2,170,407 issued August 22, 1939.

It is an object of this invention to provide a reversible hammermill of this type having means for arresting the escape of dust and deflecting particles from passing out through the entrance feed.

Figure 1:
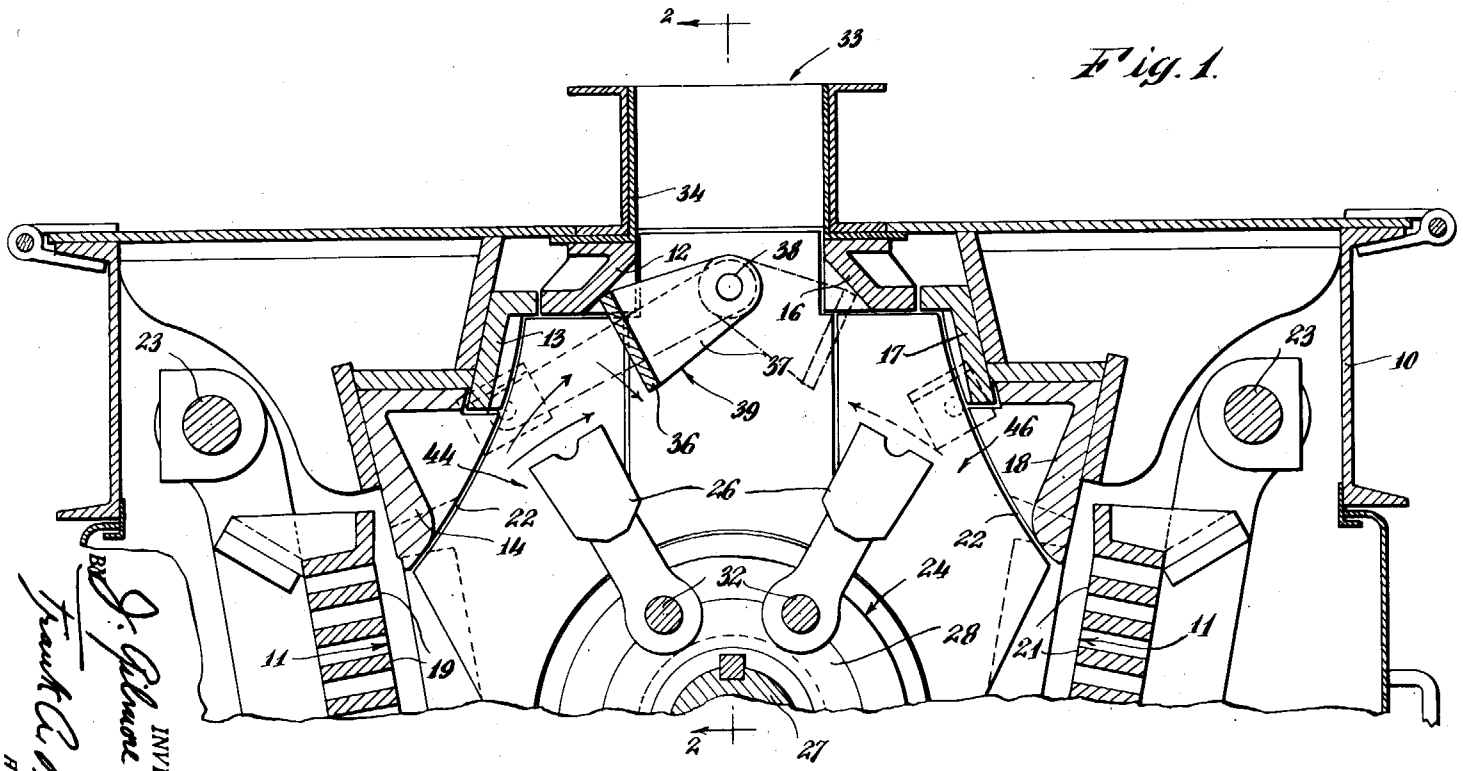
Figure 2:
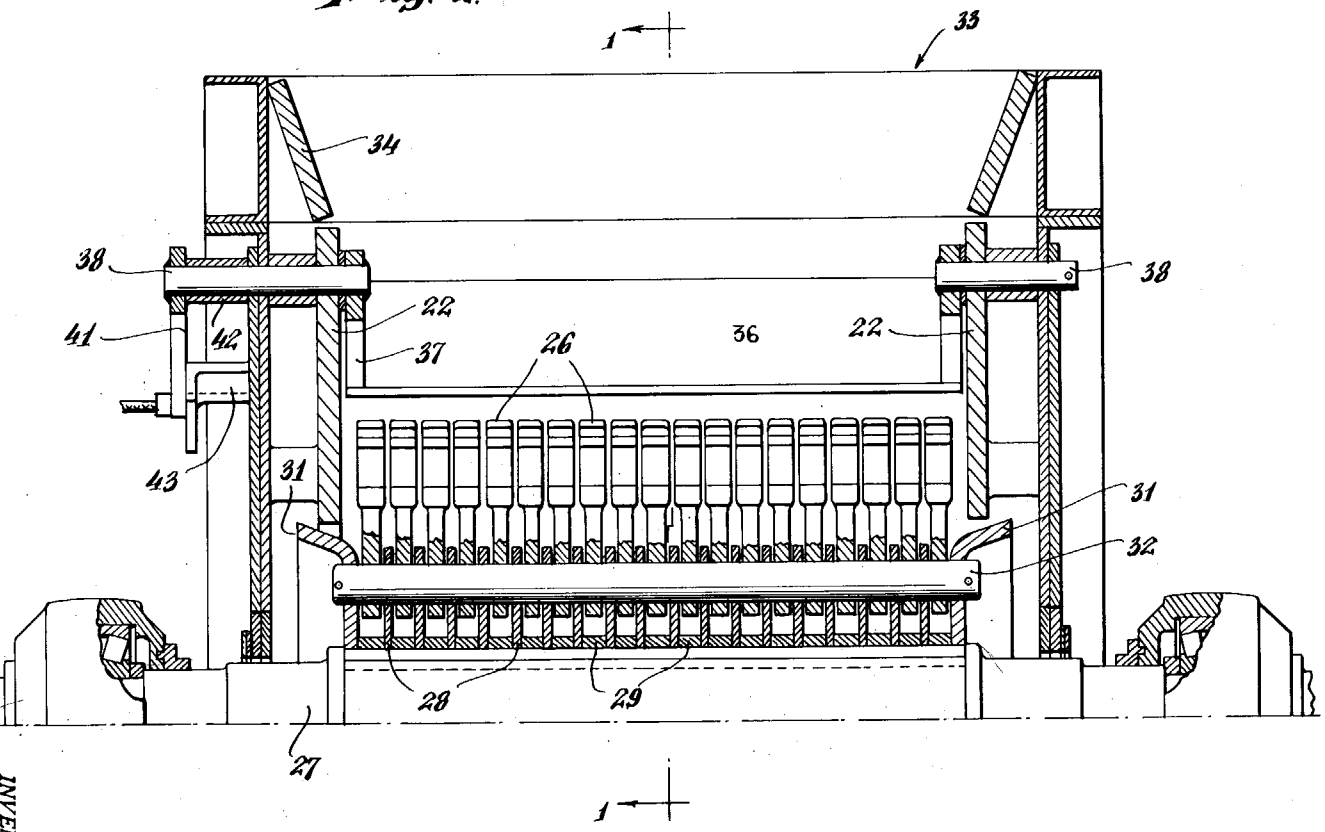

These and other objects of this invention will be better understood from the following detailed description of the specific embodiment with reference to the accompanying drawings of which;

Fig. 1 is a sectional view of the upper part of a reversible hammermill showing the dust arrester; and Fig. 2 is a side sectional view of the reversible hammermill taken on line II—II of Fig. 1.

The machine shown in Figs. 1 and 2 comprises a frame 10 which supports and encloses the crushing machinery.

Supported within the frame 10 is a cage 11 formed by left breaker plates 12, 13 and 14 and right breaker plates 16, 17 and 18, and screen bars 19 and 21, and frame liners 22. The screen bars 19 and 21 are pivoted on cage hinge shafts 23, and enclose a hammer mechanism 24. The hammer mechanism 24 is composed of hammers 26 fastened on a rotary shaft 27 through disks 28 and hammer suspension bars 32. The disks 28 are regularly spaced along shaft 27 by spacers 29 and the disks 28 at each end abut against collars 31 on the shaft 27. The hammer suspension bars 32 extend longitudinally through suitable holes in the disks 28 at regularly spaced intervals around the circumference of these disks. The hammers 26 are pivoted on the bars 32.

The frame 10 has a hopper or feed chute 33 centrally positioned on its upper side to feed material to be crushed through a hopper liner 34 into the cage 11 above the hammer mechanism 24. The shaft 27 is suitably driven by means not shown to rotate the hammers 26 in either direction.

The breaker blocks are arranged symmetrically on each side of the cage 11 to receive the material to be crushed upon rotation of the hammer mechanism 24 in either direction. Material introduced through hopper 33 is crushed and reduced in a manner illustrated and discribed in U. S. Patent No. 2,170,407 to Stanley D. Hartshorn issued August 22, 1939.

As the hammers 26 rotate and crush the material small particles of dust formed during the crushing operation are thrown or rise from the crushing operation and escape through the hopper 33. According to this invention, to prevent this escape of dust and other small particles, a plate 36 is provided which abuts against the upper breaker block 12. This plate 36 has arms 37. Each of the arms 37 receives a shaft 38 which extends from the side of the frame 10 passing through suitably provided apertures in the frame 10 and the hopper liner 34. The baffle 39 comprising the plate 36 and the arms 37 is centered in the upper part of cage 11 immediately above the hammer mechanism 24 and with a minimum clearance above the outermost extremity of the path of the hammers 26. One side of the plate 36 abuts against the upper breaker block 12 and extends into the cage 11 obliquely at an acute angle to the vertical dimension of the hammermill and substantially perpendicular to a tangent to the path of the hammers 26. An arm 41 is fastened on the outer end of one of the shafts 31 and suitably spaced away from the frame 10 by a sleeve 42. The arm 41 is provided at its end with a bracket 43 suitable for securing the arm 41 in place. The cage 11 above the hammer mechanism 24 is symmetrical and spacious so that the hammers may rotate in either direction and impact the material to be crushed on either side. The impacting zone at the top of cage 11 is thus divided into a chamber 46 on the right side as shown in Fig. 1 for the impacting upon clockwise rotation of the hammer mechanism 24 and a chamber 44 on the left side as shown in Fig. 1 for impacting upon counterclockwise rotation of the hammer mechanism 24. The shafts 38 turn in the hopper liner 21 and the frame 10 to swing the plate 36 into contact with either the breaker block 12 in the chamber 46 or the breaker block 16 in the chamber 44. The bracket 43 is fastened to frame 10 by suitable means not shown so as to hold plate 36 close to one or the other of the breaker blocks 12 and 16.

The baffle 39 may be set with the plate 36 close to or abutting either breaker block 12 or breaker block 16. As shown in Fig. 1, the baffle 39 is fastened with the plate 36 abutting the left breaker block 12 in chamber 46. In operation the hammers 26 engage the material to be crushed which is fed through hopper 33 into the cage 11 and as shown in Fig. 1 is impacted and thrown against the right breaker blocks 16, 17 and 18 for reduction. As described in the Hartshorn Patent No. 2,107,407 above referred to, the material is further reduced and removed from the hammermill by screen bars 19 and 21 of the cage 11. The rapidly moving hammers 26 rotating in the cage 11 produce a current of air which travels upward with the rising side of the hammer mechanism 24. This current of air enters the large impacting zone and sweeps tangentially from the circle of hammer rotation roughly following the contour of chamber 46. In the absence of the device of this invention the current of air escapes from the chamber 46 passing upward and out through the feed hopper 33 causing a back draft out of the hopper which retards the feeding of uncrushed material. Dust formed during the reduction operation and carried around in this current of air also passes out through hopper 33. At the high operational speed of the hammermill small particles are thrown off tangentially from the hammers. Some of the particles that are thrown off when the hammers are passing through the upper portion of the case 11 fly upward into the hopper 33 and also escape out of the top. This back draft and escape of dust and small particles is objectionable. As provided for by this invention in prevention of these objections, the plate 36 extends across the chamber 46, as shown in Fig. 1, from the breaker block 12 to a line immediately adjacent the outer diameter of the path of the rotating hammers 26. The plate 36 together with the chamber 46, as shaped by the breaker blocks 12 and 15, form a recess in which the upward travelling current of air from the hammers 26 sweeps around in a semicircle and is deflected by the plate 36 away from the hopper 33 and back into the circle of hammer rotation where it becomes part of the air travelling with the hammers 26. Concomitantly, the hammers 26 as they pass the lower edge of the plate 36 reduce the pressure on the side of the plate 36 near the hopper 33. The reaction from this lowered pressure increases the down draft through the hopper and further inhibits escaping particles. On the other hand, the baffle 39 constricts the air current passing through the chamber 46 to build up a pressure on the opposite side of the baffle 39 in the chamber 46. This pressure tends to back up into the screen bar sector of the cage 11 and force the air to escape through the screen bars 19 and 21 and thus cut down the volume of air which tries to force its way into chamber 46 and out through hopper 33. Small particles tangentially catapulted from the hammers 26 strike the plate 36 when released in the chamber 46 and are deflected downward toward the screen bars 19 and 21.

When the hammermill is reversed so that the hammers run in a counterclockwise direction an identical operation of the baffle 39 may be obtained by reversing its position to the right of cage 11 in chamber 44, as shown in Fig. 1, and into engagement with the breaker block 16. The bracket 43 is suitably fastened in this position and the above described operation of the hammermill will be obtained in the reverse direction.

The plate 36 in addition to deflecting inwardly the dust particles rising from below also will serve to deflect the particles of the material to be crushed introduced through hopper 33. This is of advantage as in a hammermill the penetration of the crushed material beyond the outer edge of the face of the rotating hammer is important in reducing the attrition on the hammer and consequently lengthening its life. The plate 36 engaging the material as it comes through the hopper 33 and deflecting it to a place of engagement with the hammers 26, which place of engagement is behind the place where the material would engage the hammers were it not for this deflection, permits the material to drop further down onto the face of the rotating hammers 26.

This invention prevents the dust and small particles, formed when material such as coal is broken in a hammermill, from rising back out of the feed hopper and at the same time does not impede the feeding of the material to the hammers. Thus it separates the objectionable back draft of air, dust and small particles from the descending feed and directs both into the rotor. A hammermill operating without the device of this invention permits objectionable dust and small particles to escape from the feed hopper. The advantage of this invention is that the baffle reduces the back draft of air and deflects the current of dust-carrying air and small particles thrown off from the hammers back into the hammers from which they pass out through the screen bars 19 and 21. The recesses formed by the walls of the chambers 44 and 46 in combination with the plate 36 is advantageous as it swirls dust-carrying air current around and back into the circle of hammer rotation without forcing the current of air to seek outlet elsewhere. The lowered pressure in the hopper further inhibits escaping particles. The device of this invention is also advantageous in its reversibility which places it in the most advantageous position during the operation of the hammermill in either direction and removes it from the path of the impacted material when not used on that side of the hammermill.

It is to be understood that the baffle may consist simply of a plate placed in position to deflect the particles and back draft and create a down draft. The manner, as described, of positioning the baffle will suggest various ways of which the baffle may be moved or arranged. It will be apparent to those skilled in the art that various modifications can be made without departing from the principles of the invention as disclosed herein and for that reason it is not intended that it should be limited other than by the scope of the appended claims.

What is claimed is:

1. In a crusher a rotor having hammers adapted to receive and impact material entering vertically downward at top center of the hammercircle, a feed chute radially above said center and having its lower end in a definite fixed position spaced from the hammer circle to provide an intermediate chamber for central radial supply of the material from the chute into said hammer circle, a stationary breaker plate structure beginning at least at the said stationary lower end of said feed chute and extending along the side of said chamber, and a deflector plate at the side of said chamber interposed between said rotor and said breaker plate and extending from said breaker plate inward to a point immediately adjacent said hammer circle to intercept material from the side of said chamber and direct it inward into the hammer circle.

2. A crusher as set forth in claim 1 in which the rotor is reversible with breaker plates on each side of said chamber and the deflector is mounted on a movable support positioning said deflector interchangeably in said intercepting position at each side of the chamber.

3. *In a crusher a casing, a rotor having a plurality of spaced pivoted hammers and adapt-*

*ed to be driven alternately in opposite directions and receiving and impacting material entering radially into the hammer circle when driven in either of said directions, said rotor being driven at a speed in each direction of rotation developing currents of dust-laden air directed outward from the hammer circle, a structure for passing material to said rotor comprising a feed chute having its center in the generally vertical plane of the rotor axis and delivering the material substantially radially into the hammer circle on both sides of said plane for each direction of rotation of said hammers and means adjacent the delivery end of said feed chute forming a crushing chamber within the casing intervening between the delivery end of the feed chute and said hammer circle and having walls spaced from said hammer circle on both sides thereof and comprising plate means positioned in said chamber at a position on one side thereof where the hammers are approaching alignment with the near side of the said feed chute and extending downward and inward on one side to a point immediately adjacent said hammer circle and spaced from said center plane of the feed chute and generally in alignment with the near side of the said radial feed into the hammer circle to intercept material carried upward by said hammers on the near side of said chamber and direct it inward into the hammer circle for a corresponding direction of rotation of said hammers, said plate means being adjustable to similarly extend inward to a point immediately adjacent said hammer circle on the other side of said chamber where the hammers are approaching alignment*

*with the other near side of the said generally radial feed upon reversal of the direction of rotation of said hammers so as to correspondingly intercept material from said other side of said chamber and direct it inward into the hammer circle on said other side.*

JOHN GILMORE WILSON.

REFERENCES CITED

The following references are of record in the file of this patent or the original patent:

UNITED STATES PATENTS

| Number | Name | Date |
|---|---|---|
| 640,845 | Webster | Jan. 9, 1900 |
| 675,751 | Moustier | June 4, 1901 |
| 1,043,513 | Dell | Nov. 5, 1912 |
| 1,049,712 | Helbig | Jan. 7, 1913 |
| 1,086,868 | Stimpson | Feb. 10, 1914 |
| 1,339,950 | Fowler | May 11, 1920 |
| 1,673,465 | McLaughlin | June 12, 1928 |
| 1,769,867 | Stoner | July 1, 1930 |
| 1,997,214 | Guest | Apr. 9, 1935 |
| 2,122,965 | Swenson | July 5, 1938 |
| 2,149,571 | Battey | Mar. 7, 1939 |
| 2,170,407 | Hartshorn | Aug. 22, 1939 |
| 2,171,100 | Sakurai | Aug. 29, 1939 |
| 2,287,799 | Hartshorn | June 30, 1942 |
| 2,440,388 | Wright | Apr. 27, 1948 |
| 2,463,631 | Knight | Mar. 8, 1949 |
| 2,491,661 | Gruendler | Dec. 20, 1949 |

FOREIGN PATENTS

| Number | Country | Date |
|---|---|---|
| 682,172 | Germany | Oct. 9, 1939 |